United States Patent
James

(10) Patent No.: US 7,137,787 B2
(45) Date of Patent: Nov. 21, 2006

(54) POWDER/WROUGHT ALLOY COMPOSITE TURBINE DISC

(75) Inventor: Allister William James, Orlando, FL (US)

(73) Assignee: Siemens Power Generation, Inc., Orlando, FL (US)

(*) Notice: Subject to any disclaimer, the term of this patent is extended or adjusted under 35 U.S.C. 154(b) by 144 days.

(21) Appl. No.: 10/871,478

(22) Filed: Jun. 17, 2004

(65) Prior Publication Data
US 2005/0281677 A1 Dec. 22, 2005

(51) Int. Cl.
*F01D 5/02* (2006.01)
(52) U.S. Cl. .............................. 416/213 R; 416/244 A
(58) Field of Classification Search ............ 416/244 A, 416/248, 213 R, 234
See application file for complete search history.

(56) References Cited

U.S. PATENT DOCUMENTS

| | | | |
|---|---|---|---|
| 4,214,906 A * | 7/1980 | Langer et al. | .......... 416/241 B |
| 5,746,579 A | 5/1998 | Amos et al. | |
| 6,190,133 B1 | 2/2001 | Ress, Jr. et al. | |
| 2003/0217792 A1 | 11/2003 | James | |

OTHER PUBLICATIONS

MatWeb. Online Material Data Sheet. Silicon Carbide. www.matweb.com/search/SpecificMaterialPrint.asp?bassnum=CC0005. Accessed Jan. 4, 2006.*
MatWeb. Online Material Data Sheet. Molybdenum. www.matweb.com/search/SpecificMaterialPrint.asp?bassnum=AMEMo00. Accessed Jan. 4, 2006.*
MatWeb. Online Material Data Sheet. Alumina. www.matweb.com/search/SpecificMaterialPrint.asp?bassnum=BA2H. Accessed Jan. 4, 2006.*

* cited by examiner

Primary Examiner—Edward K. Look
Assistant Examiner—Richard A. Edgar

(57) ABSTRACT

A composite turbine disc includes a bore section providing a first set of mechanical and temperature resistance properties, and a rim section which provides a second set of mechanical and temperature resistance properties. The second set of mechanical properties and temperature resistance are superior to the first set of properties. An intermediate diaphragm section is disposed between the bore section and the rim section. The intermediate section has mechanical and temperature resistance properties in a range between the first and second set of properties.

19 Claims, 2 Drawing Sheets

POWDER/WROUGHT ALLOY COMPOSITE TURBINE DISC

FIELD OF THE INVENTION

This invention relates generally to gas turbine engines, and more specifically to turbine discs for such engines.

BACKGROUND

Gas turbine engines include a compressor section for supplying a flow of compressed combustion air, a combustor section for burning a fuel in the compressed combustion air to produce thermal energy, and a turbine section for converting the thermal energy into mechanical energy in the form of a shaft rotation. Many parts of the combustor section and turbine section are exposed directly to hot combustion gasses. For example, the combustor, the transition duct between the combustor and the turbine section, and the turbine stationary vanes, discs and rotating blades are all exposed to hot combustion gases.

It is also known from basic thermodynamics that increasing the firing temperature of the combustion gas may increase the power and efficiency of a combustion turbine. Modern high efficiency combustion turbines have firing temperatures that may be well in excess of the safe operating temperature of the structural materials used to fabricate the hot gas flow path components. Special superalloy materials have been developed for use in such high temperature environments.

These materials have been used with specific cooling arrangements, including film cooling, backside cooling and insulation. Superalloys are well known in the art of power generation. Superalloys are based on Group VIIIB elements and usually consist of various combinations of Fe, Ni, Co, and Cr, as well as lesser amounts of W, Mo, Ta, Nb, Ti, and Al. The three major classes of superalloys are nickel-based, iron-based, and cobalt-based alloys. Nickel-based superalloys can be either solid solution or precipitation strengthened. Solid solution strengthened alloys are used in applications requiring only modest strength.

A precipitation-strengthened alloy is required in the most demanding applications such as the hot combustion gas flow path sections of gas turbine engines. The primary strengthening phase in nickel-based superalloys is $Ni_3(Al, Ti)$, which is referred to as gamma prime. A characteristic of the gamma prime strengthened nickel-based superalloys is that they retain their strength at elevated temperatures and may be used in load-bearing structures to the highest homologous temperature of any common alloy system, being up to $Tm=0.9$, or 90% of their melting point.

Although nickel-based alloys are commonly used as the material for aircraft engine discs, application of these materials in industrial gas turbines results in significant technical problems as well as increased costs. For example, the manufacture of large industrial gas turbine discs via the conventional cast/wrought processing route is difficult. The starting ingots are already at their size limit for the avoidance of unacceptable segregation related defects, thus limiting the choice of available alloys. The number of presses with sufficient capacity to forge such discs is also extremely small. An alternative to cast/wrought processing is the powder metallurgy approach. Although powder metallurgy eliminates the need for casting large ingots, a high capacity forging press is still required. Neither the cast/wrought or powder metallurgy processing routes avoid the expense associated with the additional alloy cost.

SUMMARY

The invention provides an new and economical method for the manufacture of large high performance turbine discs having a novel composite architecture. Discs according to the invention significantly reduce the alloy costs associated with nickel-based discs and also significantly reduce the above-described manufacturing difficulties.

A composite turbine disc includes a bore section providing a first set of mechanical and temperature resistance properties, and a rim section which provides a second set of mechanical and temperature resistance properties. The second set of mechanical and temperature resistance properties are different and generally superior as compared to the first set of properties. An intermediate diaphragm section is disposed between the bore section and the rim section. The intermediate section has mechanical and temperature resistance properties in a range between the first and second set of properties.

The bore section can comprise steel. The length of the intermediate section can be between 10% and 80% of an overall length of the disc. The intermediate section preferably provides an elastic modulus greater than the bore section and less than the rim section, and a coefficient of thermal expansion less than the bore section and greater than the rim section. The rim section can comprise a single crystal or an equiaxed nickel-base superalloy material.

The intermediate section can provide a non-uniform composition. The strength of the intermediate section can increase monotonically when moving radially outward from the bore. At least one of the rim and the bore can include at least one feature for improving the strength of the bore and rim bonding surfaces with the intermediate section.

A method of fabricating a composite turbine disc includes the steps of providing a bore section providing a first set of mechanical properties and temperature resistance properties, and providing a rim section having a second set of mechanical properties and temperature resistance properties, wherein the second set of properties are different and generally superior as compared to the first set of properties. An intermediate section is formed between the bore section and the rim section, the intermediate section having mechanical properties and temperature resistance properties in a range between the first and second set of properties.

The forming step preferably comprises powder metallurgy. In this embodiment, the method can further comprise the step of securing the bore section to the rim section in a spaced apart arrangement to form a cavity having at least one hole, and filling the cavity with a powder. The powder can comprises a superalloy powder. Hot isostatic pressing (HIP) can be used to consolidate the powder and obtain a good metallurgical bond between the respective sections.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

Figure 1:
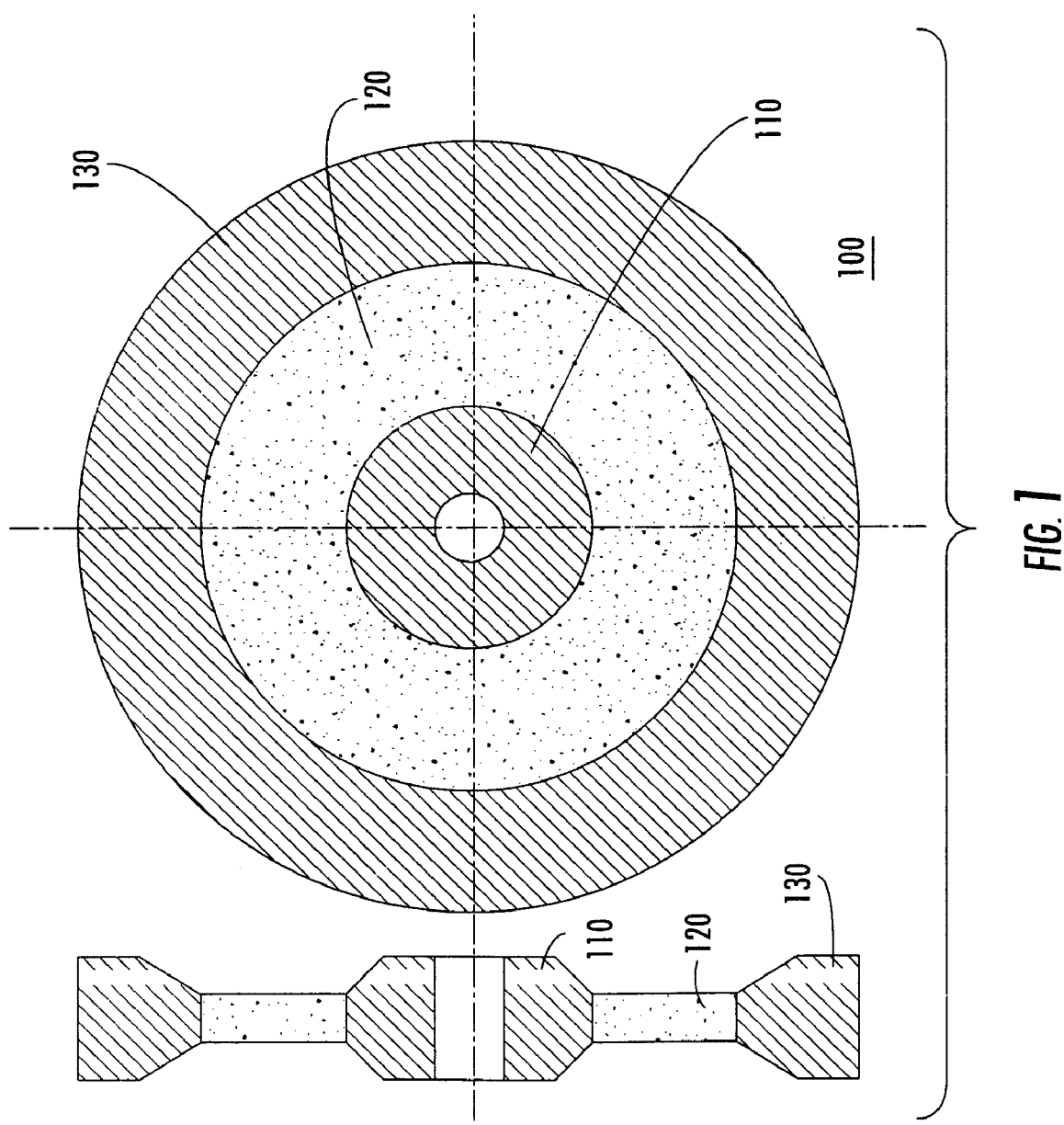
FIG. 1 shows a cross-sectional view of a disc for a gas turbine having a superalloy rim section, a low cost alloy bore section, and a powder metallurgy formed intermediate section disposed between the bore and rim section. An isostatic view of the same is also provided.

FIG. 1 illustrates a schematic of a composite disc 100 according to an embodiment of the invention. The bore section 110 provides a first set of mechanical and temperature resistance properties. Rim section 130 provides a second set of mechanical and temperature resistance properties, the second set of properties different from the first set of properties. An intermediate diaphragm section 120 is disposed between the bore section 110 and the rim section 130. The intermediate section 120 has mechanical and temperature resistance properties in a range between the first and second set of properties. This arrangement can minimize problems with the mechanical (elastic modulus) and temperature resistance (thermal expansion) mismatch of alloy properties between the bore 110 and the rim 130. Such problems can result in reduced service life resulting from mechanisms including creep, thermal mechanical fatigue (TMF) and high cycle fatigue (HCF) damage.

Bore 110 can be manufactured from conventional low cost/low temperature capability alloy materials, such as steel. Rim 130 is preferably manufactured from a high temperature performance alloy, such as a nickel-based superalloy. Intermediate section 120 is preferably formed using a process comprising powder metallurgy and provides intermediate mechanical properties and thermal expansion properties relative to bore 110 and rim 130.

An exemplary method for forming composite discs according the invention can begin with forging bore section 110. Rim section 130 can then be manufactured by ring rolling or forging a superalloy material, for example alloy 720Li or IN718. The intermediate section 120 is preferably formed using powder metallurgy.

Figure 2:
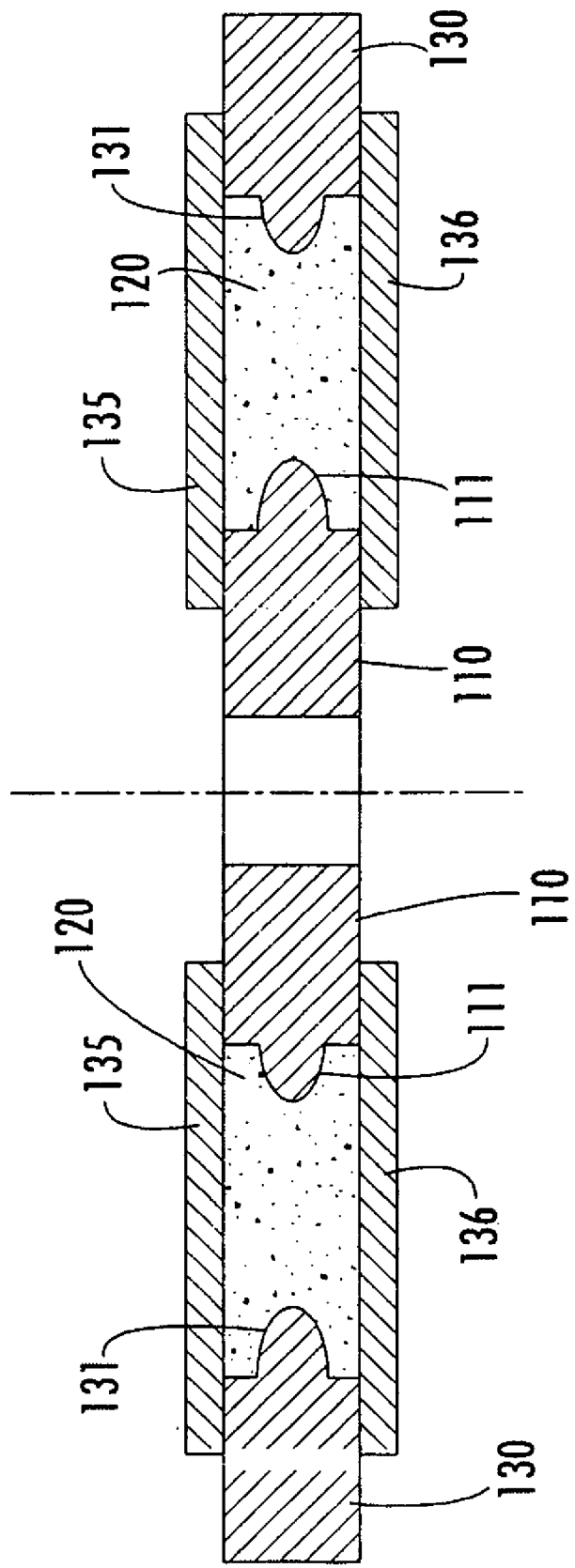
FIG. 2 shows a cross-sectional view through the powder/wrought disc showing an exemplary method of manufacture of composite disks according to the invention.

FIG. 2 shows a cross-sectional view through the powder/wrought disc showing an exemplary method of manufacture according to an embodiment of the invention.

Encapsulation plates 135 and 136 are applied to secure the rim 130 and bore 110 sections. Using this method, the length of intermediate section 120 can be conveniently varied to optimize a given design requirement by changing the spacing between bore 110 and rim 130. For example, the length of the intermediate section 120 can be 5%, 10%, 15%, 20%, 30%, 40%, 50%, 60%, 70% or 80% of the overall (radial) length of disc 100.

The upper encapsulation plate 135 can include a fill hole (not shown) to permit introduction of powder alloy material in the cavity region 120 formed between the bore 110 and rim 130. Cavity region 120 following powder processing becomes intermediate section 120. A powder, such as superalloy powder 720Li, IN706 or IN718, can be added to the assembly to fill the cavity region 120. Once the cavity 120 is filled with the powder and mechanically densified, the fill hole (not shown) is preferably sealed to fully encapsulate the powder.

Mechanical vibration may be used to ensure complete filling and to aid full densification of the final product. The assembly is then preferably hot isostatic pressed (HIP) to consolidate the powder and obtain a good metallurgical bond between the respective sections 110, 120 and 130. The rim section 130 is generally polycrystalline and equiaxed where the shape of the grains are substantially equal in all directions rather than single crystal. However, if extreme rim temperatures are expected a single crystal rim section 130 can be beneficial. Thus recrystallization of rim section 130 during HIP is generally of a lesser concern. In some applications it can be desirable to grow the grains in the rim section 130 during the HIP cycle.

The powder used to form intermediate section 120 can have a non-uniform composition throughout its volume. One portion of section 120 may be formed of powder specially selected for a particular property. For example, a particularly corrosion resistant composition may be used in a portion proximate to a surface exposed to a corrosive environment, and a particularly strong composition may be used in a portion subject to high stress. Any number of different compositions may be used in a section 120, and the change from one composition to another composition may be blended gradually from one section to another. For example, section 120 can provide a strength which monotonically increases when moving radially outward from the bore. In one embodiment, the monotonic increase can be substantially linearly graded. It may be possible to fill section 120 with different powder compositions if separator rings are employed between the different grades of powder. Such separator rings could be removed prior to HIP requiring removal and replacement of cover plate 135. Alternatively, the rings could be retained in the final product. In this embodiment, the rings could be made of a thin foil material which would not degrade the integrity of the final component.

The rim 130 and bore 110 can include one or more features on the bonding surface to provide mechanical integrity and improve alignment between the bore and rim sections. FIG. 2 shows rim 130 and bore 110 having respective features 131 and 111 to provide enhanced mechanical integrity to the finished disc.

The method of fabrication described above may be used to form improved composite components other than turbine discs which include a single crystal material in a first portion of the component where the improved material properties of a single crystal material are needed, such as in an area exposed to very high peak temperature, an especially high stress or a highly corrosive environment. The first portion of the component can be chosen to have a relatively simple geometry when compared to other portions of the component or the component as a whole. The relatively simple geometry of the first portion will facilitate the casting of the first portion as a single crystal with a reduced rejection rate when compared to casting a more complicated geometry. The relatively simple geometry may be successfully cast as a single crystal structure with a superalloy material.

A second portion of the component that can have a shape that is more complex than the first portion may be formed from a powder metallurgy material. The second portion of the component is selected to include areas that are less demanding on the material properties, i.e. areas having a surface exposed to a lower temperature, lower stress regions, or surfaces exposed to a less corrosive environment. The powder metallurgy material may be less dense than the single crystal material, thus reducing the overall weight of the component when compared to the same structure cast entirely from the single crystal material. Typically, the density difference between cast single crystal material and powder metallurgy material is 5–8%; for example, CMSX-4 is 8.72 g/cm$^3$ and IN738 is 8.1 g/cm$^3$. A third portion having lower cost and lower density as compared to the second portion can be disposed on the second portion opposite the first portion. The third portion further reduces the overall weight of the component.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim:

1. A composite turbine disc comprising:
   a bore section formed from a first alloy having a first set of mechanical and temperature resistance properties;
   a rim section, formed from a second alloy having a second set of mechanical and temperature resistance properties, said second set of mechanical properties and temperature resistance properties being different from said first set of properties of the first alloy; and
   an intermediate diaphragm section disposed between said bore section and said rim section, said diaphragm section having mechanical properties and tempature resistance properties in a range between said first and second set of properties.

2. The disc of claim 1, wherein said intermediate section provides an elastic modulus greater than an elastic modulus of said bore section and less than an elastic modulus of said rim section.

3. The disc of claim 1, wherein said intermediate section provides a coefficient of thermal expansion less than a coefficient of thermal expansion of said bore section and greater than a coefficient of thermal expansion of said rim section.

4. The disc of claim 1, Wherein said second alloy forming the rim section comprises a single crystal nickel-based superalloy material.

5. The disc of claim 1, wherein said second alloy forming the rim section comprises an equiaxed nickel-base superalloy material.

6. The disc of claim 1, wherein said first alloy forming the bore section comprises steel.

7. The disc of claim 1, wherein said intermediate section comprises a non-uniform composition.

8. The disc of claim 1, wherein a strength of said intermediate section increases monotonically when moving radially outward from said bore.

9. The disc of claim 1, wherein at least one of said rim and bore includes at least one feature for improving a strength of a bonding surface with said intermediate section.

10. The disc of claim 1, wherein a length of said intermediate section is between 10% and 80% of an overall length of said disc.

11. A method of fabricating a composite turbine disc, comprising the steps of:
    providing a bore section formed from a first alloy having a first set of mechanical properties and temperature resistance properties;
    providing a rim section, formed from a second alloy having a second set of mechanical properties and temperature resistance properties, said second set of properties being different from said first set of properties of the first alloy; and
    forming an intermediate section between said bore section and said rim section, said intermediate section having mechanical properties and temperature resistance properties in a range between said first and second set of properties.

12. The method of claim 11, wherein said forming step comprises powder metallurgy.

13. The method of claim 12, further comprising the step of securing said bore section to said rim section in a spaced apart arrangement to form a cavity having at least one hole, and filling said cavity with powder.

14. The method of claim 13, wherein said powder comprises a superalloy powder.

15. The method of claim 12, further comprising the step of hot isostatic pressing (HIP).

16. The method of claim 11, wherein said second alloy forming the rim section comprises a single crystal nickel-based superalloy material.

17. The method of claim 11, wherein said second alloy forming the rim section comprises an equiaxed nickel-base superalloy material.

18. The method of claim 11, wherein said first alloy forming the bore section comprises steel.

19. The method of claim 11, wherein at least one of said rim and bore include at least one feature for improving a strength of a bonding surface with said intermediate section.

* * * * *